United States Patent [19]

Levy et al.

[11] Patent Number: 4,504,438

[45] Date of Patent: Mar. 12, 1985

[54] METHOD AND APPARATUS FOR DETERMINING THE DENSITY CHARACTERISTICS OF UNDERGROUND EARTH FORMATIONS

[76] Inventors: Richard H. Levy, 4124 55th Ave. NE.; Paul M. Mockett, 4209 55th Ave. NE., both of Seattle, Wash. 98105

[21] Appl. No.: 327,751

[22] Filed: Dec. 7, 1981

[51] Int. Cl.³ .................. G01V 5/00; G21G 1/06
[52] U.S. Cl. .................................. 376/156; 250/256
[58] Field of Search .............. 250/256, 261, 262; 376/156; 73/643; 455/620

[56] References Cited

U.S. PATENT DOCUMENTS

| | | | |
|---|---|---|---|
| 2,332,873 | 10/1943 | Silverman | 250/266 |
| 2,721,943 | 10/1955 | Armistead | 250/265 |
| 2,830,187 | 4/1958 | Scherbatskoy | 250/265 |
| 2,963,587 | 12/1960 | Rickard | 250/266 |
| 2,984,745 | 5/1961 | Scherbatskoy | 250/265 |
| 2,998,521 | 8/1961 | Rankin, Jr. | 250/270 |
| 3,156,822 | 11/1964 | Tittman | 250/266 |
| 3,278,748 | 10/1966 | Powell | 250/265 |
| 3,509,342 | 4/1970 | Dewan | 250/269 |
| 3,778,614 | 12/1973 | Hounsfield | 250/362 |
| 3,881,110 | 4/1975 | Hounsfield et al. | 250/360 |
| 3,924,129 | 12/1975 | LeMay | 250/336 |
| 3,970,936 | 7/1976 | Arnold | 455/620 |
| 4,005,290 | 1/1977 | Allen | 250/266 |
| 4,035,639 | 7/1977 | Boutemy et al. | 250/266 |
| 4,044,240 | 8/1977 | Cox, Jr. et al. | 364/300 |
| 4,072,289 | 2/1978 | Brueckner et al. | 364/414 |
| 4,135,247 | 1/1979 | Gordon et al. | 364/414 |
| 4,149,249 | 4/1979 | Pavkovich | 364/414 |
| 4,168,435 | 9/1979 | Duinker | 364/414 |
| 4,205,375 | 5/1980 | Inouye et al. | 364/414 |
| 4,212,062 | 7/1980 | Kohno et al. | 364/414 |
| 4,217,641 | 8/1980 | Naparstek | 364/414 |
| 4,222,104 | 9/1980 | Moore | 364/414 |
| 4,233,662 | 11/1980 | LeMay | 364/414 |
| 4,259,725 | 3/1981 | Andrews et al. | 364/521 |
| 4,293,912 | 10/1981 | Walters | 364/414 |
| 4,385,634 | 5/1983 | Bowen | 73/643 |

FOREIGN PATENT DOCUMENTS 1283915  8/1972  United Kingdom .

OTHER PUBLICATIONS

Malmqvist et al., "Theoretical Studies of In-Situ Rock Density Determinations Using Underground Cosmic-Ray Muon Intensity Measurements with Application in Mining Geophysics", 44 *Geophysics*, pp. 1549-1569 (Sep. 1979).
Gordon, "Image Reconstruction from Projections", *Scientific American*, pp. 56-68 (Oct. 1975).
Redington & Berninger, "Medical Imaging Systems", *Physics Today*, pp. 36-44 (Aug. 1981).
Crouch et al., "Deep Underground Measurements of Cosmic Ray Muons and Neutrinos", *Proceedings of the Eleventh International Conference on Cosmic Rays*, Budapest 1969, Paper MU-21.
Keuffel et al., "Zenith-Angle Distribution of Ultra-High Energy Muons", *Proceedings of the Eleventh International Conference on Cosmic Rays*, Budapest 1969, Paper MU-31.
Alvarez, "A Method to X-Ray the Egyptian Pyramids to Search for Unknown Chambers", *Adventures in Experimental Physics*, p. 75, (1972).

*Primary Examiner*—Sal Cangialosi
*Attorney, Agent, or Firm*—Weingarten, Schurgin, Gagnebin & Hayes

[57] ABSTRACT

A plurality of detectors (12) are disposed within a bore hole (14) for ascertaining the frequency and trajectory of high energy muons which penetrate through the earth. This information is converted by data processor (42) into an integrated density value of the earth for incremental angular lines of sight extending through spaced apart elevations along the detectors (12). The data processor (42) uses a tomographic analysis process to combine together all of these integrated density values for all of the elevations of interest to calculate the densities of discrete spatial volumes composing the underground region being investigated. Detectors (12) produce electrical signals indicative of the trajectory of the passing muon. The signals are recorded by time-to-digital convertor ("TDC") units (30). If the signals appear to have possibly originated from a high energy muon, a microprocessor (38) retrieves the information collected by TDC units (30) and transmits it to a data logger (40) located at the earth's surface. The data processor (42) then utilizes tomographic analysis to make the localized density determinations discussed above.

20 Claims, 3 Drawing Figures

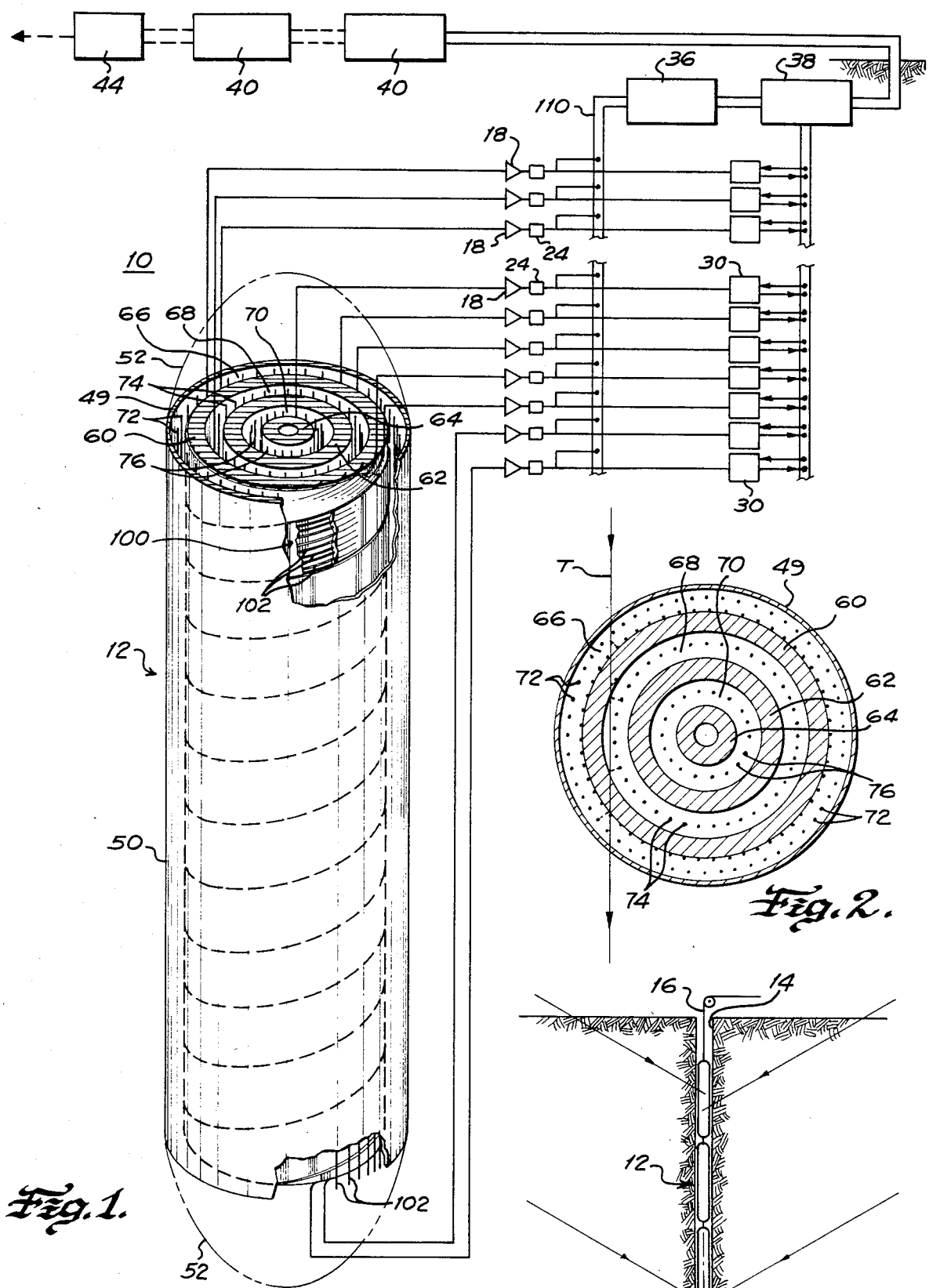

METHOD AND APPARATUS FOR DETERMINING THE DENSITY CHARACTERISTICS OF UNDERGROUND EARTH FORMATIONS

DESCRIPTION

1. Field of the Invention

The present invention relates to methods and apparatus for investigating the characteristics of underground earth formations by determining underground density patterns, and more particularly to using cosmic ray muons to ascertain means or integrated densities along numerous trajectories, and subsequently using tomographic analysis to convert these mean densities into local density values over the entire region covered by the muon trajectories.

2. Background Art

In the past, characteristics of underground earth formations have been investigated by use of various techniques which can be divided into those which require drilling and those which do not. In the latter category are such surface methods as gravimetric surveys which detect the earth's gravitational anomalies and seismic surveys which utilize shock waves to investigate changes in the earth's density. While these methods are useful, they tend to exhibit large scale features and do not yield detailed localized information. In the former category, drilling techniques, through for instance coring or mud logging, yield abundant information, but are highly localized covering a small cylindrical region surrounding the hole. Thus a combination of techniques may be required; for example, the existence of an ore body may be determined by gravimetric measurements, but its precise delineation may require the drilling of numerous holes.

Several other known down-hole study methods use gamma rays whether naturally occurring or induced by neutron activation. Because gamma rays have ranges of a few meters in earth, the methods depending on them yeild information only on a region of the same size. Examples of gamma ray detection systems designed to determine the composition of underground earth formations and distinguish between rock, sand, silt, water and other components include U.S. Pat. Nos. 2,332,873; 2,984,745 and 2,998.521. Other systems are specifically intended to provide information regarding the porosity of the strata through which a bore hole or well extends. Examples of such systems are found in U.S. Pat. Nos. 3,509,342; 4,005,290 and 4,035,639. As disclosed in U.S. Pat. Nos. 2,963,587; 3,156,822; and 3,278,748, a further type of system utilizes a series of gamma radiation detectors to analyze the chemical elements that are present in the earth formations surrounding a well bore.

Gamma ray detection systems of the nature discussed above employ various types of gamma radiation counting or detecting devices to measure both naturally occurring and induced gamma radiation. The use of Geiger-Muller detectors is disclosed by U.S. Pat. Nos. 2,332,873; 2,963,587; 2,998,521; 3,156,822; and 3,278,748. Scintillation counter detectors coupled with photomultipliers are employed in U.S. Pat. Nos. 2,830,187; 2,963,587; 2,984,745; 3,156,822; 3,278,748; and 3,509,342. Gamma ray detection systems incorporating ionization chamber detectors are set forth by U.S. Pat. Nos. 2,332,873 and 4.035,639. A gamma ray detection system including a proportional counter detector is disclosed by U.S. Pat. Nos. 4,005,290. U.S. Pat. Nos. 2,721,943 utilizes a combination scintillation/Geiger-Muller detector composed of a Geiger-Muller type photoelectric detector housed within an inner cylinder which is disposed within an outer cylinder containing liquid luminophor. The scintillations emitted by the liquid luminophor from incident gamma radiation are amplified by the light detector and then converted into electrical pulses.

Detectors utilized in gamma ray detection systems have been designed to monitor only gamma rays reaching the detector from particular directions. In U.S. Pat. Nos. 2,830,187; 2,984,745; and 3,156,822, the detectors screen out all gamma radiation except radiation approaching from a direction generally perpendicular of the length of the hole.

As stated above, gamma ray techniques are only capable of providing information concerning conditions within a few meters of the hole, and more information can generally be obtained only by drilling more holes. In contrast, cosmic ray muons have a spectrum of energies which extends well beyond a million MeV, and such muons, especially the more energetic ones, have ranges in earth measured in kilometers. The study of the transmission of such muons can therefore yield information concerning the density of the earth over distances of this general magnitude.

The sources, trajectories, isotropy, energy spectrum, composition and other properties of cosmic ray muons have been exhaustively studied in an academic context. For instance, Crouch et al. in "Underground Measurements of Cosmic Ray Muons and Neutrinos", *Proceedings of the 11th International Conference on Cosmic Rays*, Budapest 1969, paper MU-21, reports installing scintillation detectors in deep underground locations to investigate the trajectories at which muons and neutrinos strike the earth. Keuffel et al. in "Zenith-Angle Distribution of Ultra-High Energy Muons", *Proceedings of the 11th International Conference on Cosmic Rays*, Budapest 1969, Paper MU-31, discusses placing muon detectors in underground locations to study the intensities of incident muons as a function of their zenith angle.

As discussed by Alvarez in "A Method to 'X-Ray' the Egyptian Pyramids to Search for Unknown Chambers", *Adventures in Experimental Physics*, p. 175 (1972), cosmic ray muons have been utilized in an attempt to search for hidden chambers in the Second Pyramid of Chephren in Egypt. The trajectories of the muons passing through the pyramid were monitored by two vertically spaced apart spark chambers. Each spark chamber was composed of two flat metal plates disposed horizontally relative to each other and spaced approximately one centimeter apart. When a muon penetrated the two places, a high voltage was applied between the plates causing a spark to jump from one plate to another along very nearly the same trajectory as the passing muon. A separate triggering system was required to apply the high voltage across the metal plates at the correct time. The locations of the sparks were recorded by two cameras aimed at the gap between the plates of the spark chambers with the cameras disposed at right angles to each other. In a later version of the apparatus, the coordinates of the spark were recorded directly on magnetic tape by a nickel wire magnetostrictive readout.

The present invention involves determining the mean or integrated density of the earth along paths which muons travel through the earth and then using tomographic analysis to convert these mean densities into local density values. In the past tomographic techniques have been used in medical applications. In the medical context this technique employs the principle that X-rays, traversing the body, are partially absorbed by the tissue in their path, and the transmission of these X-rays therefore indicates the total integrated density of tissue along the path of the X-rays. Ordinary X-ray procedure involves using a fan-shaped beam of X-rays emanating from a fixed source. Such an exposure yields the integrated tissue density along all the lines traversed by the fan. Typically, in tomography, the source of the X-rays and the sensing plane, for instance a film or other detector, are rotated together while the object, a head or a whole body, remains fixed. As a result, the integrated density along lines having many different directions is obtained. A mathematical procedure is then employed to convert the totality of such integrated measurements into localized density values. Once this convolution has been performed, the local densities thus obtained can be displayed in many different forms, one of which is a contour map showing local densities in any chosen plane.

In the present invention, cosmic ray muons are used in place of X-rays since their range is appropriate to the size of the subjects being studied. Cosmic ray muons strike the earth from all directions, and as long as the direction from which each muon arrives is properly measured, this isotropy plays the same part as the rotation of the source of X-rays in medical tomography. The data thus obtained yields the integrated densities along lines arriving at a particular detector from a range of directions. An array of detectors may be arranged, for instance, to extend down a hole instead of in a plane as in a medical situation. But by a substantially similar mathematical procedure, the totality of line densities thus obtained from all of the detectors can be converted into detailed local densities. This information can then be displayed in any convenient form, including the local densities in any plane.

General discussions of tomography in a medical context appear in the articles "Image Reconstruction from Projections" by Richard Gordon, *Scientific American*, pages 56-68 (October 1975); and "Medical Imaging Systems", Rolland Redington and Walter Berniger, *Physics Today*, pages 36-44 (August 1981). Prior art patents generally pertaining to tomography systems and specifically concerning different tomographic analysis methods are disclosed by U.S. Pat. Nos. 4,044,240 (concerning a transverse section tomography system for providing a reconstructed image of a planar section of a subject); 4,072,289 (pertaining to an analog method and apparatus for producing an axial tomographic image of the human body); 4,135,247 (involving a tomography system for processing data from a plurality of projections in essentially real time to produce a reconstructed image immediately following completion of a scan); 4,149,249 concerning a method and apparatus for tomographic analysis wherein the linear projections are obtained by passing radiation in quasi-planar form through the quasi-plane of the object slice at various angles and measuring the amounts of radiation not absorbed or scattered by the object slice); 4,168,435 (concerning a method for pre-processing radiological information by means of electronic analog techniques for subsequent use in a process for reconstructing a three-dimensional image of a desired laminal of a subject); 4,205,375 (involving a specific tomographic analysis procedure for reconstructing a three-dimensional image utilizing Fourier transformations); 4,212,062 (pertaining to a tomographic imaging process in which a convolution integration over an infinite region is approximated by an integration over a finite region by employment of a predetermined weighing function); 4,217,641 (concerning an image processing apparatus which makes corrections for polychromatic distortion and images produced by the nonlinear interaction of body constituents with a polychromatic X-ray beam); 4,222,104 (relating to a process for improving the accuracy of the reconstruction portion of a tomographic process by first processing the X-ray attenuation data using a procedure and electronic circuits for fan distributed radiation paths and the reprocessing the data using the same algorithm procedure and circuits for parallel radiation paths); 4,233,622 (concerning a corrected layergram technique); 4,259,725 (pertaining to a system for generating cursors that are overlayed and movable on a preliminary computerized tomography generated X-ray view that is already on a display screen); and, 4,293,912 (concerning an apparatus and method for performing a convolution operation on at least part of the sets of electronic data from which represent absorption in the fan-shaped regions without binning the electronic data into parallel ray data sets with a convolution function to form convoluted data).

DISCLOSURE OF THE INVENTION

The present invention relates to a method and an apparatus for utilizing cosmic ray muons to ascertain the local density features of large underground earth formations to assist, for instance, in locating mineral deposits, promising oil or natural gas reservoirs, coal horizons, voids, structural anomalies and other features which can be related to local density variations. Cosmic ray muons continuously strike and penetrate the earth from all directions. These muons possess the falling energy spectrum. Like other charged subatomic particles, muons lose energy by ionization processes. The energies of muons diminish as they travel through the earth, and more specifically, the rate at which muons lose their energy, and thus their attenuation, is related to the type and density of the material through which they pass. For a given energy, muons can travel further through less dense material than through relatively more dense material. Thus, it is expected that less attenuation of the muon flex will occur in portions of an underground earth formation which is less dense than in sections which are of higher density since lower energy muons are also capable of penetrating the less dense portions of the earth formation. In other words, for a given time interval, more muons will arive at a detector along a path of lower density than along a path of higher density. Thus, by monitoring the frequency and trajectories at which muons pass through the earth, the density features of the underground earth formation may be explored. These concepts are used to investigate the local density characteristics of large volume underground earth formations.

A plurality of muon detectors are placed at underground locations to monitor the flux and trajectories of incident muons striking the detectors. From this data the integrated density along incremental angularly separated lines of sight extending through spaced apart elevations or elevational ranges of the detector can be determined. For each individual elevation or elevational range along the detectors, the integrated density along a particular direction is the result of the densities of all of the different local density variations along the path.

By the present invention the size and location of individual structural anomalies or other density related features may be determined. This is accomplished by using a mathematical procedure to convert the totality of all of the integrated density measurments along all of the lines of sight for all of the selected elevations along the detectors into localized values. In other words, the density at each point or spatial volume comprising the region under investigation is determined. These localized density values can be displayed in various manners, such as a contour map showing local densities upon any chosen plane in a manner similar to that commonly generated in medical examinations.

According to the method of the present invention, each time a muon penetrates the earth and passes through a detector, a first set of electrical signals is produced on particular sensing wires disposed within the detector and a second set of electrical signals is induced on certain pickup wires also located within the detector. The relative timing of the individual signals of the first set and the particular wires in which the signals are produced are indicative of the asimuth angle of the muon; and the timing of the individual signals of the second set and the particular pickup wires in which the signals are induced are indicative of the zenith angle of the muon and the elevation along the height of the detector at which the muon entered and exited the detector. The signals produced by the detector are electronically amplified and shaped within the underground detector. The signals are then transmitted to time-to-digital convertors (hereinafter "TDC") units which record the relative times at and the particular wires in which the signals of each set were produced.

The detectors employed to ascertain the frequency and trajectory of incident muons operate in a manner somewhat similar to a proportional particle counter. In one particular embodiment of the detectors of the present invention, the detector includes a circular, elongate housing which encases a plurality of coaxially disposed filter rings which form a plurality of annularly-shaped gas containing chambers. The passage of a muon through the chambers results in the liberation of free electrons from the gas molecules. A plurality of sensing wires are arranged in a circular array to extend longitudinally through each of the chambers. A constant level direct current electrical potential is applied between the sensing wires and the corresponding filter rings so that electrons generated by the passage of a muon through the gas chambers drift at constant velocities toward the sensing wires to produce an electrical signal in the wires. The relative times at which the signals are produced in the sensing wires are indicative of the distances traveled by the electrons and thus reflect the distances separating the sensing wires and the path of the muon. These relative times are monitored by the TDC units for subsequent use by a data processor together with the determination of the particular wires in which the signals were produced in determining the azimuth angle component of the trajectory of the muon.

To determine the zenith angle and the elevation of the muon trajectory, a belt composed of electrically conductive pickup wires is wrapped around the exterior of the outermost filter ring. The electrical signals produced in the sensing wires induce corresponding signals at adjacent locations on the pickup wires. The relative times at which the electrical signals reach the opposite ends of the pickup wires and knowledge of the precise wires in which the signals were induced are used to calculate elevations at which the muon entered and left the detector. From this information the zenith angle and the elevation of the muon may be determined. TDC units are employed to monitor the relative times at which the signals reach the ends of the pickup wires. From the zenith and azimuth angle components and from knowing the elevation along the detector at which the muon passed through the detector, the trajectory of the muons passing through the detectors may be determined.

The signals produced on the sensing wires are transmitted to a triggering device disposed within the detector, which device makes an identical determination of whether the signals possibly originated from a high energy muon.

It is known that the high energy muons are not affected by Coulomb scattering to the same degree as low energy muons and so high energy muons are deflected relatively little by their collisions with other particles and thus typically travel in substantially straight lines. However, low energy muons often change direction upon colliding with other particles and as such typically move along relatively nonlinear paths. Since only the routes which the high energy muons travel along to reach the detector are determinable, only the signals produced by high energy muons are of interest. When the triggering device determines that an electrical signal resulted most likely from a high energy muon, the TDC units are momentarily stopped and a microprocessor is activated to retrieve data from the TDC units. This information along with information regarding the location of the detectors below the earth is transmitted to and stored in data logger located at the earth's surface.

As briefly mentioned above, tomographic analysis is used to convert data regarding the tragectory and frequency of the muons into the local density features of very large underground earth formations. A data processor is employed to first determine the generalized or integrated densities of the earth along incremental angularly separated lines of sight extending through vertically spaced apart elevations along the detectors and then transform this information into localized density values for each spatial point composing the underground region under investigation. To reduce the number of computations which must be performed, the angularly separated lines of sight may in fact be composed of cone-shaped volumes of sight having the apexes at a particular elevation along the detectors and radiating outwardly from such common apex point. Likewise, rather than determining a localized density value at every point of the underground region, such values can be determined for individual volumetric sections of the region. As a result, by the present invention it is possible to determine the location and size of rather small voids, structural anomalies and other density related features of the earth which may correspond to the locations of mineral deposits, promising oil or natural gas reservoirs or coal horizons.

Although by the above-described invention it would be possible to determined the total density features of the entire volume of the earth through which the muons pass prior to reaching the detector, this may be somewhat impractical since for a given depth as the zenith angle increases muons must travel greater distances through the earth to reach the detectors. As a result, for a particular depth the rate at which the muons strike the detectors decreases with increased zenith angle. Correspondingly, the time required to gather sufficient data regarding the density features of the earth surrounding the detectors increases with the zenith angle of the muons. So, as a matter of practicality, the envelope of the volume of earth investigated by the present invention is in the form of a cone having its apex at the location of the lowermost detector and its base at the earth's surface. The particular cone angle which is selected may depend on various factors such as the depth of the detectors, the distance to adjacent detection bore locations and the available monitoring time.

BRIEF DESCRIPTION OF THE DRAWINGS

The details of one typical embodiment of the present invention will be described in conjunction with the accompanying drawings in which:

FIG. 1 is a schematic view of a system for investigating the density features of underground earth formations by monitoring the flux of cosmic ray muons penetrating the earth along different trajectories with a muon detector shown in isometric view;

FIG. 2 is a cross-sectional view of the muon detector illustrated in FIG. 1; and FIG. 3 is a schematic view of a plurality of muon detectors constructed according to the present invention and illustrated as disposed within a bore hole.

BEST MODE OF THE INVENTION

Referring initially to FIG. 1, a system 10 constructed according to the best mode of the present invention currently known to the applicants for using cosmic ray muons to ascertain the local density features of large underground earth formations is schematically illustrated. System 10 monitors the frequency with which the muons pass through a conically-shaped section of the earth and the trajectory of these muons and then utilizes this information to develop a three-dimensional map or other representation of the local density features of the earth formation under investigation. Additionally referring to FIG. 3, in basic form system 10 includes a plurality of cosmic ray detectors 12 suspended within a bore hole 14 in interconnected relationship by a support line 16. Each time a muon penetrates the earth and passes through a detector 12, a set of electrical signals are produced by the detector which correspond to the presence and trajectory of the muon. The signals are composed of two sets, a first set indicative of the azimuth angle of the muon trajectory and a second set indicative of both the zenith angle of the muon trajectory and of the elevation along the height of the detector at which the muon enters and exits the detector. The signals are amplified by amplifiers 18 and shaped as desirable by signal shapers 24 using well-known techniques. The amplified and shaped signals are transmitted to time-to-digital convertor (hereafter "TDC") units 30 that record the relative times at which the individual signals of each set are produced. Signals from amplifiers 18 and shapers 24 are also transmitted to a triggering device 36 that determines whether the electrical signals produced by detectors 12 possibly resulted from a high-energy muon. If this appears to be the case, the triggering device momentarily stops the TDC units and activates a microprocessor 38 to retrieve from the TDC units the relative times at which the individual electrical signals were produced by the detectors. This information together with information regarding the depth of the detectors below the ground is stored in a data logger 40 located at the earth's surface and then is transmitted to a data processor 42 which utilizes tomographic techniques to convert the information stored in the data logger into local density profiles of the underground earth formation. The density profiles may be shown on a visual display unit 44 from which geological maps may be made.

Considering the above, briefly described, method and apparatus of the present invention in more detail, as most clearly illustrated in FIGS. 1-3, detectors 12 are preferably formed in the shape of an elongate cylinder having an outer casing 49 with a tubular body portion 50 and closed ends 52 to thereby pass down a well or bore hole. Appropriate interconnecting devices, not shown, are provided at each end of casing 49 to interconnect the detectors with support line and signal bus 16.

Each detector 12 operates on a principle somewhat similar to the operation of proportional particle counter and, in one preferred embodiment, is formed with a cylindrically-shaped outer filter ring 60, an intermediate filter ring 62 disposed within the outer filter ring and an inner filter ring 64 disposed within the intermediate filter ring. The three filter rings are aligned in coaxial relationship to each other and extend substantially the full length of casing 49. The outer filter ring 60 is smaller in diameter than casing 49 to define an annularly-shaped outer chamber 66 therebetween. Outer ring 60 and intermediate ring 62 together define an annularly-shaped intermediate chamber 68 therebetween, and intermediate filter ring 62 and inner filter ring 64 together define an annularly-shaped, inner chamber 70 therebetween. The chambers 66, 68 and 70 are sealed and each is filled with a suitable gas, such as an argon/ethane mixture. The specific type of gas may be varied to alter the sensitivity of detector 12 in a manner known in the art.

A plurality of very small diameter sensing wires 72 extend longitudinally through outer chamber 66. Corresponding sensing wires 74 extend longitudinally through intermediate chamber 68 and sensing wires 76 extend longitudinally through inner chamber 70. Except for the number of sensing wires 72, 74 and 76 in each chamber 66, 68 and 70, respectively, the arrangement and construction of the sensing wires are identical; thus, only sensing wires 72 will be described with particularity with it being understood that the description of the construction and operation of sensing wires 72 also is applicable to sensing wires 74 and 76.

Sensing wires 72 function similarly to the inner wire electrode of a gas particle counter. They are positioned around the circumference of chamber 66 and are equally spaced apart from each other to define a circular array. Preferably sensing wires 72 are located radially approximately midway between casing 49 and outer filter ring 60 and are electrically insulated from casing 49 and rings 60, 62 and 64. Also, each of the wires 72 are insulated relative to each other.

For detector 12 to operate accurately, it is important that the spacing remains constant throughout the entire length of the wires. Thus, if required, spacers, not shown, may be provided to assist in maintaining the spacing between the wires. Ideally the spacers, if utilized, are formed from electrically non-conductive material to avoid interfering with the operation of detector 12.

In the operation of detector 12, an electrical potential is imposed between wires 72 and casing 49 and outer ring 60 with the wires serving as an anode and the casing and outer ring serving as a cathode. Likewise, an electrical potential is applied between intermediate sensing wires 74 and outer and intermediate filter rings 60 and 62 and between sensing wires 76 and intermediate and inner filter rings 62 and 64. The strength of the field in the vicinity of wires 72, 74 and 76 may be altered by varying the diameter of the sensing wires or by varying the applied voltage. As a non-limiting example, the diameter of wires 72, 74 and 76 may be approximately 50 microns. Also, preferably the sensing wires are formed from a highly conductive, high-strength material, such as stainless steel, but other materials or combinations of materials may be utilized, such as gold-plated tungsten.

Preferably the detector is operated at a voltage slightly above its proportional region in a mode which has been described as a limited streamer mode by Atac and Tollestrup in an article entitled "Self-Quenching Streamers" Fermi National Accelerator Laboratory, FN-339, 2562.000, (July 10, 1981). When operating in this mode, a large current (approaching 10 milliampere) of relatively short duration can be produced at specific location in a very short time (less than 100 nanoseconds) on the sensing wires. As discussed in this article, operation in the limited streamer mode is achieved by proper choice of applied voltage, gas mixture and gas pressure. As a typical but nonlimiting example, the gas within chambers 66, 68 and 70 may be composed of approximately fifty percent argon and approximately fifty percent ethane to cause the electrons to collect at a particular location on the sensing wires closely adjacent to the elevation at which the muon passed by the sensing wires. Also, the gas mixture within the chambers may be presurized, for instance, to appoximately two atmospheres to produce electrical pulses on the sensing wires which are larger in charge and shorter in duration than if a lower pressure is used.

When a muon passes through detector 12 along a trajectory, such as trajectory T illustrated in FIG. 2, a wake of free electrons are left behind in the gas in chambers 66 and 68. These electrons are attracted to nearby sensing wires 72 and 74 by the positive voltage existing in the wires. The electrons drift along radial paths toward the adjacent sensing wires, as figuratively illustrated in the dot-dash lines in FIG. 2. As the electrons closely approach the wires, they gain energy from the electrical field and more vigorously collide with other gas atoms and ion pairs causing a multiplication of free electrons. The electrons collect at discrete individual locations on the sensing wires 72 and 74 resulting in the generation of an electrical pulse or "hit" on each wire which travels along the wire. As discussed more fully below, the existence of the pulse on each sensing wire 72 and 74 is independently recorded by a TDC unit 30, as is the time at which the pulse occurred.

The velocity at which the free electrons initially generated within chambers 66 and 68 by a passing muon drift toward sensing wires 72 and 74 is dependent upon the strength of the electrical field, the pressure of the gas, and the type of gas. As a consequence, once these parameters have been chosen, the time that it takes for the free electrons to travel through the gas and reach the individual sensing wires 72 and 74 is a measure of how close the muon passed by a particular sensing wire. This travel time for the electrons can be determined from knowledge of the inital time, $t_0$, at which the muon passed through the detector and the subsequent times at which electrical pulses were produced on the sensing wires. The initial time for the passage of the muon, $t_0$, can be calculated from the geometry of the hits which occurred (the particular sensing wires in which electrical pulses were produced) and the recorded times of the pulses. As long as three or more sensing wires were activated by the passing muon, the geometry of the hits and the recorded times of the hits can be utilized in a "least squares" computation to determine the intital time, $t_0$, for the passage of the muon. This type of computation is well-known to those skilled in the art of the present invention, however, to the knowledge of the applicants this is the first time that this analysis has been carried out in relationship to the particular geometry defined by the hits occurring on sensing wires 72, 74 and 76 of the present invention.

From the determination of the time interval required for the electrons to reach the sensing wires, the distance between the path of the passing muon and the sensing wires can be calculated. WIth this information and with knowledge of the relative positions of the sensing wires, the precise muon trajectory projected on a transverse plane or azimuth angle, can be determined.

The zenith or dip angle component of the muon trajectory and the elevation at which the muon enters and extis the detector (hereafter "elevation") are also sensed by detector 12. With the known zenith and azimuth angles and elevation of the muon, the trajectory of the muon can be determined. The components of detector 12 which are used to determine the zenith angle and elevation of the muons include a belt 100 of cathrode pickup wires 102 which is wound in spiral fashion around outer filter ring 60 to form convolutions or windings which cover the outer surface of the filter ring. The ends of the belt may be beveled to substantially completely face the upper and lower end portions of ring 60. The pickup wires 102 comprising belt 100 are equally laterally spaced apart from each other, disposed parallel to each other and extend the entire length of the belt having opposite ends at the upper and lower ends of the detector. The wires are electrically insulated from each other and from filter ring 60. As with sensing wires 72, 74 and 76, pickup wires 102 are preferably constructed from durable, highly-conductive material, such as copper. The upper and lower ends of each wire 102 is connected to a TDC unit 30 through the intermediacy of an amplifier 18 and a shaper 24.

In operation, when a muon passes through detector 12 and causes electrons liberated from the gas in chamber 66 to produce an electrical pulse in sensing wires 72, corresponding pulses are induced in pickup wires 102 at locations adjacent the elevation in which the electrical pulses are produced in the sensing wires. The electrical signal induced in pickup wires 102 travel upwardly and downwardly along the length of the pickup wires. By using the TDC units 30 to monitor the relative times at which the electrical pulse reaches the opposite ends of each wire 102, it is possible to determine the particular convolution or wrap at which the pulse was induced in the pickup wires. Also, from the wrap angle of the belt 100, it is possible to compute the location along the length of the convolution at which the pickup wire is located most closely to the particular sensing wire 72 from which the electrical pulse was induced in the pickup wire. With this information, it is possible to calculate the precise location along the length of pickup wire 102 at which the electrical pulse was induced and thus determine the elevations along the height of detector 12 at which the muon entered and exited the detector. This in turn enables the zenith angle and the elevation to be ascertained.

As an alternative to sensing the difference in time that the electrical signals reach the ends of pickup wires 102 for determining the zenith angle and elevation of the muon, instead the size of the electrical charges reaching the ends of the signal wires can be measured. The relative sizes of the charges reaching the opposite ends of the wires is indicative of where along the length of the wire the hit occurred. From this information, the particular convolution or wrap at which the pulses were included in the wire can be determined.

The number of pickup wires 102 comprising belt 100 may be varied to optimize the operation of detector 12. As a muon passes through chamber 66, electrical signals may likely be produced on a cluster of sensing wires 72, and the electrical pulses produced on each sensing wire 72 may induce a corresponding electrical pulse or hit on pickup wires 102. In wider belts composed of the larger number of wires, there is less likelihood of more than more hit occurring in a particular pickup wire and thus less likelihood of miscalculating from what particular sensing wire the electrical signal in the pickup wire was induced. However, because with each convolution of the belt each pickup wire 102 extends a longer distance along the length of the detector in wider belts than in narrower belts, the particular location along the length of the detector at which the signal was induced in a pickup wire is less accurately determinable. Also, a larger number of amplifiers 18, shapers 24 and TDC units 30 are required. In the opposite situation, if a narrow belt of wires 102 is used or if belt 100 is composed of a single pickup wire, more than one hit will occur in a particular pickup wire thereby creating ambiguities as to from what particular sensing wire 72 hit was induced in the pickup wire.

Rather than being wound around outer filter ring 60 in the manner illustrated in FIGS. 1 and 2, belt 100 instead may be disposed in other locations within detector 12 such as along the inside surface of casing 14 or around the outside surface of intermediate filter ring 62. The elongate, cylindrical shape of the above detector 12 is particularly well suited to be placed down vertical or diagonal wells or bore holes. It is to be appreciated that if a detector is located elsewhere, such as in a mine drift or shaft or adjacent a cliff, the detector can be constructed in other shapes, such as rectangular, without departing from the spirit or essential characteristics of the present invention.

As discussed above, because low energy muons are significantly affected by Coulomb scattering and thus change directions upon colliding with other particles, it is not possible to trace the path through which they passed through the earth before reaching the detector. To help reduce the numbers of low-energy muons which pass through chambers 66, 68 and 70, to thereby help minimize the frequency at which nonusable signals are generated in sensing wires 72, 74 and 76 and in pickup wires 102, preferably filter rings 60 and 62 and 64 are formed from high density material such as lead.

System 10 also includes amplifiers 18 and shapers 24 located within casing 49 for amplifying the signals received from sensing wires 72, 74 and 76 and pickup wires 102 and altering the signals into a shape more appropriate for triggering device 36. Such amplifiers and shapes are well-known in the art and thus will not be further described.

The amplified and shaped signals are transmitted to TDC units 30 which record the time at which pulses are produced in sensing wires 72, 74, and 76 and the times at which induced pulses reach the opposite ends of each pickup wire 102. The TDC units continually operate unless momentarily stopped to read out the information stored within the units, as discussed more fully below. TDC units which are capable of recording events within an accuracy of a few nanoseconds are now available. An example of one such TDC unit is manufactured by Radio Corporation of America and designated as Model No. TCS282. The TDC units are located within casing 49 and are interconnected with amplifiers 28 and shapers 24 by transmission lines.

The amplified and shaped signals are also transmitted to a triggering device 36 through the use of a triggering bus 110. Triggering device 36 makes a determination of whether the signals might have originated from a high energy muon. If the signals could have resulted from a high energy muon, the triggering device activates a microprocessor 38 which momentarily stops the operation of the TDC units so that the information stored within the units may be read out by the microprocessor. After this information is received from TDC units, the microprocessor permits the TDC units to return to their normal operation to again record the times at which electrical signals are produced in sensing wires 72, 74 and 76 and in pickup wires 102. As a result, the TDC units are permitted to operate proportionally more of the time in their data intake or record mode than in their readout mode. This is important since during the times that the microprocessor is retrieving information stored in the TDC units, the TDC units cannot record hits occuring on the sensing or pickup wires. Moreover, by using the triggering device to attempt to discriminate between signals caused by high energy muons and other sources, the proportion of nonusable data reaching data logger 40 and data processor 42 is reduced.

To enable it to function in the manner described above, triggering device 36 may be designed in various ways. For instance, the triggering device may be designed to activate microprocessor 38 when signals are produced on more than one sensing or pickup wire. Alternatively, the triggering device may be constructed to activate the microprocessor when electrical signals are produced on the wires in a particular pattern which could be equivalent to making an initial determination of the trajectory of the muon.

To reduce the complexity of the triggering device, it may be designed to distinguish signals produced from high and low energy muons from signals caused by background radiation and noise since this is an easier determination to make than trying to distinguish between the signals caused by high and low energy muons. In this situation, the high and low energy muons are differentiated from each other when their trajectories are calculated by data processor 42.

The minimum number of muons that must pass through detectors 12 from a given direction for system 10 to be able to determine the mean density of the underground earth formation along the individual angularly separated lines of sight depends on the desired level of accuracy of the density determination. Factors which affect the rate at which muons may strike a detector 12 from a particular angle include the density and composition of the surrounding underground earth formation and the distance that the muons must travel through the earth to reach detectors 12. This distance depends on, inter alia, the depth of the detectors below ground level, the topography at the surface of the earth and the zenith angle of the muon. Although muons strike the earth's surface from all angles and not just from the radial direction, as the zenith angle of the muon increases, the distance through the earth which they must travel to reach the detector 12 also increases. As a result, for a particular detector depth the number of muons reaching detector 12 normally diminishes with an increasing zenith angle. Thus, as a matter of practical consequence, preferably the volume of the earth which is investigated by system 10 is shaped in the form of a cone having its apex located at the bottom of the lowermost detector 12 and its base located at the surface of the earth. The cone-angle of the cone may be in the order of approximately sixty degrees. However the particular cone-angle chosen will depend on such factors as the depth of the detectors and the time available for monitoring the muons. It is to be appreciated that the present invention enables volumes of earth to be investigated that are several orders of magnitude larger than can be investigated by currently known methods, including the use of gamma ray detectors.

As briefly discussed above, triggering device 36 signals the microprocessor when a possible high energy muon has passed through detector 12. When notified, microprocessor 38 momentarily stops the TDC units 30 so that the latest data monitored by the TDC units can be extracted and transmitted to a data logger 40 located above ground. By retrieving only the information received by the TDC units in the latest time interval of a predetermined length, extraneous information from earlier arriving low energy muons, background radiation or other noise sources is not retrieved by the microprocessor. As with triggering device 36, microprocessor 38 is also located within detector casing 49. The microprocessor is interconnected with a data logger 40 by an appropriate transmission line in a manner well-known in the art.

Since muons do not strike the earth with sufficient frequency for density determinations to be made in real time, a data logger 40 is used to store information received from microprocessor 38 for subsequent analysis. Data loggers, such as logger 40, are in common use and thus need not be further described. They typically store information on different types of hardware such as on a magnetic tape or disc.

System 10 also includes a data processor 42 which uses the data stored in logger 40 to determine the trajectory and flux of the muons passing through detectors 12. As discussed above, the muon flux reaching a detector along a particular trajectory depends upon the density of and the distance through the earth which the muon travels through to reach the detector. Thus, from knowledge of the trajectory of the muons passing through the detector, the flux at each of these trajectories and the distance through the earth that the muons traveled, the data processor can determine integrated density values along individual lines of sight passing through a specific elevation or elevational range of the detector. Each line of sight has an azimuth angle component and a zenith angle component and divides the underground region into discrete paths which pass through the particular elevation or elevational range of the detector. Alternatively, the lines of sight may in fact be in the form of individual cone-shaped volumes having its apex at the detector and radiating outwardly through the earth formation from the detector. The integrated density values for each of these lines of sight is the result of the totality of the densities of the different portions of the earth formation through which the lines of sight extend. These integrated density determinations along the lines of sight which the underground formation is divided into may be made at spaced apart elevations along the length of each detector or along discrete elevational ranges of each of the detectors. By determining integrated density values at different points along the detector(s), muons passing through a particular point or location in the underground region may be monitored at different angles in a manner similar to which a tissue structure in a human body is viewed from many different X-ray angles during a computerized axial tomography (hereafter "CAT") scanning examination. In the present situation the data processor can be programmed to perform a tomographic analysis to thereby combine the totality of the integrated density values determined for the lines of sight for all of the elevations or elevational ranges to thereby generate the localized density values for each specific spatial point in the underground region. To reduce the numerical computations which must be made and/or to reduce the amount of data which must be accumulated, rather than determining the local density value for each specific point a density value can be determined for discrete volumetric sections of the underground region. As in CAT scanning, these individual density values can be unfolded from the integrated density values which represent a summation of/or the total density of the earth along each of the lines of sight.

By using the method and apparatus of the present invention to determine localized density values for each individual point or volumetric section of the region being investigated, different density features of the region may be distinguished from each other, even those which are closely located together and/or are approximately of the same density. Also, the positions of the density features relative to the detector may be determined. In general, the use of tomographic analysis makes it possible to accurately and efficiently detect localized density related features of very large volumes of earth which heretofore has not been possible. Due to the precision and exactness with which density related features may be investigated with the present invention, it may serve as a valuable tool for the exploration of petroleum reserves, mineral deposits, water or other subjects of interest that exhibit characteristic density features.

The density features of the underground as generated by data processor 42 may be displayed in various quasi three-dimensional forms on visual display 44, such as in a transaxial image format or a generalized planar image format. In addition, the results of the tomographic analysis can be transmitted to a printing mechanism to generate geological maps of the underground region being investigated.

As discussed above, the distance which muons travel through the earth is one of the factors utilized in determining the integrated density values for the angular sights radiating from each detector. Because the earth surface is not perfectly smooth, the distances traveled by the muons to reach a detector is dependant upon the topography of the earth in the area surrounding the bore hole. Thus, it is important that this topography is studied and the results of the study incorporated into the mean density value calculations.

It is to be understood that data processor 42 need not be located at the cite of bore hole 14. Also, the tomographic analysis does not have to occur concurrently with the arrival of information at data logger 40, rather it can take place at a later time, for instance when sufficient data has been gathered or when computer facilities are available.

As will be apparent to those skilled in the art to which the invention is addressed, the present invention may be embodied in forms and in methods other than those specifically disclosed above without departing from the spirit or essential characteristics of the invention. The particular steps for ascertaining density features of underground earth formations and the particular embodiments of detection system 10, as described above, are therefore to be considered in all respects as illustrative and not restrictive, with the scope of the present invention being set forth in the appended claims rather than being limited to the foregoing description.

What is claimed:

1. A detector module for detecting the flux and trajectories of muons, comprising:
   a gas chamber containing ionization gas;
   plural annular, coaxial cylindrical grid structures within said chambers each comprising:
   cylindrically arranged sensing wires disposed within the chamber and arranged so that when a muon passes through the chamber electrical signals are produced in the wires which are indicative of a first vector component of the muon; and
   pickup wires disposed angularly to the sensing wires, in which pickup wires electrical signals are induced by the signals of the sensing wires which pickup wire signals are indicative of a second vector component of the muon passing through the chamber.

2. The detector module according to claim 1, including a plurality of gas chambers disposed adjacent to each other, with a plurality of sensing wires disposed within each of the gas chambers.

3. The detector module according to claim 1, wherein said gas chamber is annular in shape; and
   said sensing wires are arranged in a circular array to extend longitudinally through said chamber.

4. The detector module according to claim 1:
   wherein said pickup wires are arranged in a belt composed of a plurality of spaced apart pickup wires, said belt at least partially covering said gas chamber; and
   further including means for sensing the relative times at which the electrical signals reach opposite ends of the sensing wires.

5. The apparatus according to claim 1, further including means for sensing the relative difference in the magnitude of the electrical pulses reaching the opposite ends of each pickup wire.

6. The detector module according to claim 1, further including means for sensing the relative difference in time in which the electrical signals reach the opposite ends of each of the pickup wires.

7. The detector module according to claim 1, further including means for distinguishing whether the muon passing through the chamber is of one energy level or another.

8. An apparatus for determining the presence and trajectory of muons, comprising:
   (a) a detector module comprising a plurality of annular, coaxial cylindrical grid structures each having:
   a housing defining a gas chamber;
   a plurality of cylindrically arranged, spaced apart electrically conducting sensing wires extending through said chamber;
   an ionization gas within said gas chamber; and
   electrically conducting spaced apart pickup wires disposed adjacent to said housing; and aligned angularly to said sensing wires;
   (b) means for applying an electrical potential to said sensing wires relative to said housing;
   (c) first means for sensing electrical pulses produced in said sensing wires by multiple free electrons initiated by a muon passing through the detector and multiplied by the electrical potential;
   (d) first means for converting the electrical pulses produced in said sensing wires into an angular trajectory coordinate of the passing muon;
   (e) second means for sensing electrical pulses induced in said pickup wires by the multiple free electrons; and
   (f) second means for receiving the electrical pulses in said pickup wires at the ends of the pickup wires and for converting the received pulses into another angular trajectory coordinate of the muon.

9. A system for employing cosmic muons to ascertain the local density features of underground earth regions comprising:
   muon detector means for producing a plurality of sets of electrical signals when a cosmic muon passes through said detector means, said signal sets being indicative of the trajectory of the muon;
   recorder means for recording said signals;
   a microprocessor;
   a triggering device for determining whether the signals produced by said detector means possibly originated from a cosmic muon or from some extraneous source, said triggering device activating said microprocessor to retrieve said signals from said recorder if said signals possibly originated from a cosmic muon;
   data processing means for converting the electrical signals retrieved from said recorder means by said microprocessor into the local density features of the underground earth regions;
   said muon detector including:
   a plurality of annular, coaxial cylindrical grid structures within said chambers each comprising:
   cylindrically arranged sensing wires disposed within the chamber and arranged so that when a muon passes through the chamber electrical signals are produced in the wire which are indicative of the first vector component of the muon; and
   pickup wires disposed angularly to the sensing wires, in which pickup wires electrical signals are induced by the signals in the sensing wires which pickup wire signals are indicative of a second vector component of the muon passing through the chamber.

10. The system according to claim 9, wherein said detector means produces a first set of electrical signals indicative of a first angular coordinate of the muon travel path and a second set of electrical signals indicative of a second angular coordinate of the muon path.

11. The system according to claim 9, wherein said detector means includes:

wall means comprising at least one chamber containing ionization gas;

sensing wires disposed within each of said chambers and arranged so that when a muon passes through said detector means electrical signals are produced in said sensing wires with the signals being indicative of a first angular coordinate of the muon path; and a plurality of pickup wires located within said detector and disposed angularly to said sensing wires to receive signals induced from said sensing wires, which signals are indicative of a second angular coordinate of the muon path and the location along the detector through which the muon passed.

12. The system according to claim 11, wherein said triggering device analyzes the particular sensing wires in which electrical signals were produced and the time at which the particular signals were produced and reviews the particular pickup wires in which the electrical signals were induced and the times at which the electrical signals reached the ends of the pickup wire to determine whether the signals possibly originated from a muon passing through the detector means.

13. The system according to claim 12, wherein said data processing means:

processes the information retrieved from said recording means by said microprocessor to calculate the flux and trajectories of the muons passing through said detector means;

converts the flux and trajectory determinations into integrated density values of the underground earth region along incremental angular lines of sight extending through different locations in said detectors; and, utilizes a tomographic analysis procedure to combine the integrated density values along the lines of sight to generate local density values for individual spatial locations of the underground earth regions being investigated.

14. A method for providing underground geologic structure density profiles in an underground volume comprising the steps of:

detecting continuously over some period of time, the passage of naturally occurring muons passing on trajectories widely differing in angle and position, through a detection zone, distribution along a path in a three-dimensional volume, about which said underground volume extends in plural directions, by means of a detector assembly in said zone;

the detected muons having energies sufficiently high to provide substantially straight trajectories through said underground volume;

generating output indicia in response to the detected passage of muons through said detection zone, said indicia identifying the trajectories in three-dimensional space of said muons through the underground volume to identified locations distributed along said detection zone; and processing said output indicia by tomographic analysis to provide a three-dimensional density profile of the underground geologic structure in said underground volume.

15. The method of claim 56 wherein said generating step including the step of identifying the angle and position along said path at which said muons transit said detection zone.

16. The method of claim 14, wherein said detection zone is distributed along a vertical path and the three-dimensional density profile is of a cone-shaped region of said underground volume.

17. The method of claim 14, wherein said processing step includes filtering out signals produced by sources other than muons.

18. The method of claim 14, wherein said processing step includes producing a first set of electrical signals corresponding to a first angular coordinate of a muon trajectory and then utilizing the first set of electrical signals to induce a second set of electrical signals corresponding to a vertical coordinate and to a second angular coordinate of the muon trajectory.

19. A method for employing naturally occurring cosmic muons for ascertaining the local density features of underground earth regions, comprising:

placing a muon detector at an underground location;

sensing the frequency and trajectory of incident cosmic muons striking the detector; and ascertaining the density features of the underground regions based on the frequencies and trajectories of the muons striking the detector including:

determining integrated density values for incremental, angular paths along which muons pass through specific locations of the detector; and, combining said integrated density values by tomographic analysis to generate particularized density values for individual spatial locations of the underground region being investigated;

said muon detector including:

a gas chamber contining ionization gas;

plural annular, coaxial cylindrical grid structures within said chambers each comprising:

cylindrically arranged sensing wires disposed within the chamber and arranged so that when a muon passes through the chamber electrical signals are produced in the wires which are indicative of the first vector component of the muon; and pickup wires disposed angularly to the sensing wires, in which pickup wires electrical signals are induced by the signals in the sensing wires which pickup wire signals are indicative of a second vector component of the muon passing through the chamber.

20. A method for geological exploration for underground deposits of minerals, petroleum products, voids, structural anomolies, and other localized density related variations by utilizing muons which originate from cosmic sources comprising:

placing a plurality of muon detectors at various underground locations;

measuring the frequencies at which the muons pass through the detector;

determining the azimuth angles of the muons, the zenith angles of the muons and the locations at which the muons pass through the detectors and then combining these determinations to ascertain the trajectory of the muons; and, transforming the frequency and trajectory measurements into the localized density features of the underground earth formation being investigated;

said muon detector including:

a gas chamber containing ionization gas;

a plurality of annular, coaxial cylindrical grid structures within said chambers each comprising:

cylindrically arranged sensing wires disposed within the chamber and arranged so that when a muon passes through the chamber electrical signals are produced in the wire which are indicative of a first vector component of the muon; and pickup wires disposed angularly to the sensing wires in which pickup wires electrical signals are induced by the signals in the sensing wires which pickup wires signals are indicative of a second vector component of the muon passing through the chamber.

* * * * *

UNITED STATES PATENT AND TRADEMARK OFFICE
CERTIFICATE OF CORRECTION

PATENT NO. : 4,504,438

DATED : March 12, 1985

INVENTOR(S) : Richard H. Levy; Paul M. Mockett

It is certified that error appears in the above—identified patent and that said Letters Patent is hereby corrected as shown below:

| | | |
|---|---|---|
| Column 1, | line 12, | "means or" should read --mean or-- |
| | line 40, | "yeild" should read --yield-- |
| | line 45, | "2,998.521." should read --2,998,521.-- |
| | line 65, | "4.035,639." should read --4,035,639.-- |
| | line 67, | "U.S. Pat. Nos." should read --U.S. Pat. No.-- |
| | line 67, | "U.S. Pat. Nos." should read --U.S. Pat. No.-- |
| Column 2, | line 52, | "two places," should read --two plates-- |
| Column 4, | line 14, | "and the" should read --and then-- |
| | line 47 | "muon flex" should read --muon flux-- |
| | line 52 | "arive" should read --arrive-- |
| Column 5 | line 24 | "asimuth" should read --azimuth-- |
| Column 6 | line 35 | "in data" should read --in a data-- |
| | line 49 | "having the" should read --having their-- |
| | line 62 | "determined" should read --determine-- |

UNITED STATES PATENT AND TRADEMARK OFFICE
CERTIFICATE OF CORRECTION

PATENT NO. : 4,504,438
DATED : March 12, 1985
INVENTOR(S) : Richard H. Levy; Paul M. Mockett It is certified that error appears in the above—identified patent and that said Letters Patent is hereby corrected as shown below:

| | | |
|---|---|---|
| Column 7 | line 1, | "detectors" should read --detector-- |
| Column 9 | line 35, | "presurized" should read --pressurized-- |
| | line 67, | "inital" should read --initial-- |
| Column 10 | line 20, | "WIth this information" should read --With this information-- |
| | line 31, | "cathrode" should read --cathode-- |
| | line 46, | "is connected" should read --are connected-- |
| Column 11 | line 13, | "included" should read --induced-- |
| | line 20, | "of the larger" should read --of a larger-- |
| | line 22, | "more hit" should read --one hit-- |
| | line 53, | "particules" should read --particles,-- |
| | line 60, | "60 and 62" should read --60, 62-- |
| | line 66, | "shapes" should read --shapers-- |
| Column 12 | line 24, | "from TDC units." should read --from the TDC units-- |
| | line 34, | "occuring" should read --occurring-- |

UNITED STATES PATENT AND TRADEMARK OFFICE
CERTIFICATE OF CORRECTION

PATENT NO. : 4,504,438
DATED : March 12, 1985
INVENTOR(S) : Richard H. Levy; Paul M. Mockett It is certified that error appears in the above—identified patent and that said Letters Patent is hereby corrected as shown below:

| | | |
|---|---|---|
| Column 13 | line 1, | "inter alia," should read --<u>inter alia</u>,-- |
| | line 6, | "muon increases" should read --muons increases-- |
| Column 14 | line 34, | "section" should read --sections-- |
| Column 17 | line 38, | "regions" should read --region-- |
| | line 46, | "zone, distribution" should read --zone distributed-- |
| | line 63, | "15. The method of claim 56" should read --15. The method of claim 14-- |
| | line 64, | "including" should read --includes-- |
| Column 18 | line 30, | "contining" should read --containing-- |
| Column 20 | line 1, | "wires" should read --wire-- |

Signed and Sealed this

Twelfth Day of November 1985

[SEAL]

Attest:

DONALD J. QUIGG

Attesting Officer

Commissioner of Patents and Trademarks